Patented July 29, 1941

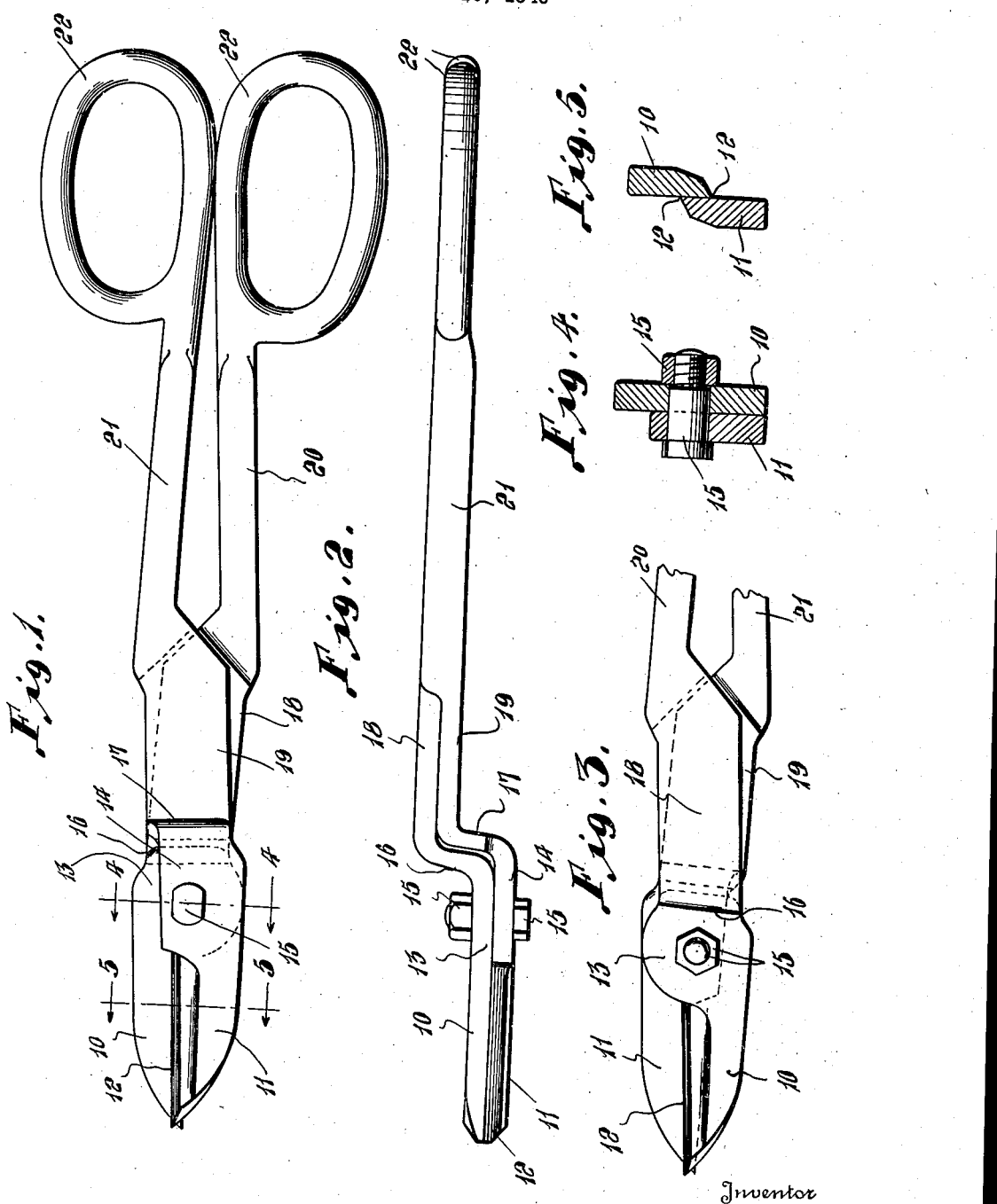

2,250,638

UNITED STATES PATENT OFFICE 2,250,638

METAL SHEARS

Karol Kubinec, Dearborn, Mich.

Application February 16, 1940, Serial No. 319,348

1 Claim. (Cl. 30—257)

This invention relates to certain new and useful improvements in metal shears.

The primary object of the invention is to provide metal shears wherein cutting blades that are pivotally connected together both carry overlying right angularly extending portions connected with handle shanks extending in a plane parallel with the plane of said cutting blades and laterally offset therefrom whereby the cut strip of metal may freely pass over the upper sides of both cutter blades without interference with the handle shanks.

With the above and other objects in view that will become apparent as the nature of the invention is better understood, the same consists in general of certain novel details of construction and combination of parts hereinafter more fully described, illustrated in the accompanying drawing, and claimed.

In the accompanying drawing:

Figure 1 is a bottom plan view of the metal shears,

Figure 2 is a side elevational view,

Figure 3 is a fragmentary top plan view,

Figure 4 is a detailed sectional view taken on line 4—4 of Figure 1, showing the pivotal connection between the cutter blades of the shears, and Figure 5 is a detailed sectional view taken on line 5—5 of Figure 1.

The shears comprise a pair of cutting blades 10 and 11 having shearing edges 12, the blades 10 and 11 comprising base portions 13 and 14, respectively of greater widths than said blades and pivotally connected together by the nut and bolt combination 15.

The cutting blades 10 and 11 respectively carry handle shanks and are connected to said handle shanks by means of substantially right angularly offset shoulder portions 16 and 17 that normally overlap each other and extend in the same direction from said cutting blades for mergence with plate portions 18 and 19, respectively, that extend at right angles from said shoulder portions in directions away from said cutting blades, the plate portions 18 and 19 forming the outer ends of the handle shanks 20 and 21 and lying in the plane of the handle shanks. At the junctures of the plate portions 18 and 19 with the handle shanks 20 and 21, there are provided coacting abutment shoulders that limit closing movements of the cutting blades. The inner ends of the handle shanks 20 and 21 carry finger loops 22. The plate portions 18 and 19 of the handle shanks normally overlie each other as illustrated, produce increased strength in the handle portion of the tool and the handle shanks 20 and 21 are of increased thickness relative to said plate portions to present said handle shanks in the same plane. The offset shoulder portions 16 and 17 present the plate portions 18 and 19 in the handle shanks 20 and 21 in a plane offset from the plane of the cutting blades 10 and 11 as illustrated in Figure 2.

It will be observed that both cutting blades 10 and 11 are in a plane offset from the plane of the two handle shanks 20 and 21 so that a strip of metal severed by the cutting blades 10 and 11 will pass over both of said cutting blades and still be located laterally of the handle shanks 20 and 21 so that the cut strip does not in any manner interfere with the operation of the shears or be in a position to injure the hands of the user.

From the above detailed description of the invention, it is believed that the construction and operation thereof will at once be apparent, and while there is herein shown and described the preferred embodiment thereof, it is to be understood that minor changes may be made in the details of construction, such as will fall within the scope of the invention as claimed.

I claim:

In metal shears of the character described, a pair of pivotally connected overlapping cutting blades, a handle shank carried by each blade with the gripping ends of the handle shank in the same plane and offset means connecting the handle shanks to said cutting blades to place the handle shanks in a plane offset from the plane of said cutting blades, the pivotal connection between the cutting blades comprising a pin extending through the rear ends of the cutting blades forwardly of said offset means, said offset means comprising shoulder portions extending at right angles to the longitudinal axes of the cutting blades and handle shanks, and said handle shanks having overlapping contacting plate portions in the plane thereof and at their outer ends merging into the shouldered portions at the ends thereof adjacent the cutting blades and coacting abutment shoulders at the junctures of said plate portions and said handle shanks in the plane of said handle shanks.

KAROL KUBINEC.